(12) United States Patent
Hou

(10) Patent No.: US 7,585,070 B2
(45) Date of Patent: Sep. 8, 2009

(54) MULTIFUNCTIONAL GLASSES

(76) Inventor: Mei-Yueh Hou, No.169, Alley 71, Lane 942, Dawan Rd., Yongkang City, Tainan County 710 (TW)

( * ) Notice: Subject to any disclaimer, the term of this patent is extended or adjusted under 35 U.S.C. 154(b) by 148 days.

(21) Appl. No.: 11/790,960

(22) Filed: Apr. 30, 2007

(65) Prior Publication Data

US 2008/0266515 A1 Oct. 30, 2008

(51) Int. Cl.
*G02C 5/14* (2006.01)
(52) U.S. Cl. .......................... 351/111; 351/62; 351/121; 351/153; 351/156
(58) Field of Classification Search .................... 351/41, 351/44, 47, 48, 57, 58, 62, 111–121, 153, 351/124–136; 16/228
See application file for complete search history.

(56) References Cited

U.S. PATENT DOCUMENTS

| | | | | |
|---|---|---|---|---|
| 3,189,913 | A * | 6/1965 | Hoffmaster | .................. 351/130 |
| 5,359,370 | A | 10/1994 | Mugnier | |
| 7,059,717 | B2 * | 6/2006 | Bloch | .......................... 351/119 |
| 7,422,322 | B2 * | 9/2008 | He | ................................ 351/153 |
| 2005/0036103 | A1 | 2/2005 | Bloch | |

FOREIGN PATENT DOCUMENTS

| | | | |
|---|---|---|---|
| EP | 1672408 A2 | 6/2006 | |
| FR | 2279241 A1 | 12/1999 | |
| FR | 2818394 | * 6/2002 | .................. 351/57 |
| FR | 2892162 A1 | 4/2007 | |
| WO | 94/11774 | 5/1994 | |
| WO | 96/24315 | 8/1996 | |
| WO | 2006/022766 A1 | 3/2006 | |

* cited by examiner

*Primary Examiner*—Huy K Mai
(74) *Attorney, Agent, or Firm*—Volentine & Whitt, PLLC

(57) ABSTRACT

The present invention relates to a pair of glasses, which includes a pair of frames, a pair of lenses, a nose bridge, and a pair of temples. Each frame has an upper convex rim and a lower convex rim at an external side. The upper convex rim has an upper aperture while the lower convex rim has a lower aperture. The lenses are fixed in the frames and the nose bridge is connected between the two frames. The frames, lenses, and nose bridge are integrally formed. Each temple has an upper bump and a lower bump at its front end. The upper bump has an upper pin for insertion into the upper aperture and the lower bump has a lower pin for insertion into the lower aperture. This design makes the assembly easy and does not require screws. With varied parts assembled in combination, the glasses can function in two different ways.

13 Claims, 5 Drawing Sheets

MULTIFUNCTIONAL GLASSES

BACKGROUND OF THE INVENTION

1. Field of the Invention

The present invention relates to a pair of multifunctional glasses. More particularly, the present invention relates to a pair of glasses that can function in two different ways.

2. Description of the Related Art

Currently, there are various kinds of glasses. However, a pair of glasses usually has only a single usage or function. For example, a pair of industrial safety glasses can merely provide protection from being hurt by scraps, solders, or other splashing chips during operation. Or, for example, a pair of motor glasses can merely provide protection from being hurt by sand grains while driving. The above two kinds of glasses do not have additional functions. Further, a pair of conventional glasses uses screws to lock temples onto the frames. Having a particular specification, the screws must be tightened by a special screwdriver, which is inconvenient.

Therefore, it is necessary to provide a pair of multifunctional glasses to solve the above problems.

SUMMARY OF THE INVENTION

The object of the present invention is to provide a pair of glasses, which includes a pair of frames, a pair of lenses, a nose bridge and a pair of temples. Each frame has an upper convex rim and a lower convex rim at an external side. The upper convex rim has an upper aperture while the lower convex rim has a lower aperture. The central axis of the upper aperture and the central axis of the lower aperture fall on the same line. The lenses are fixed in each frame, while the nose bridge is located between the two frames and connects the frames. The frames, lenses, and nose bridge are integrally formed. Each temple has an upper bump and a lower bump at its front end. The upper bump has an upper pin for insertion into the upper aperture of the upper convex rim and the lower bump has a lower pin for insertion into the lower aperture of the lower convex rim. The central axis of the upper pin and the central axis of the lower pin fall on the same line. Thus, the present invention makes assembly easy and does not require screws.

In addition, if the pair of glasses mentioned above is assembled with a nose pad, a pair of industrial safety glasses is formed. If assembled with an inner frame, a pair of clasp frames, and a glass strap, a pair of motor glasses is formed. Therefore, with varied parts assembled in combination, the glasses can function in two different ways.

DETAILED DESCRIPTION OF THE INVENTION

Figure 1:
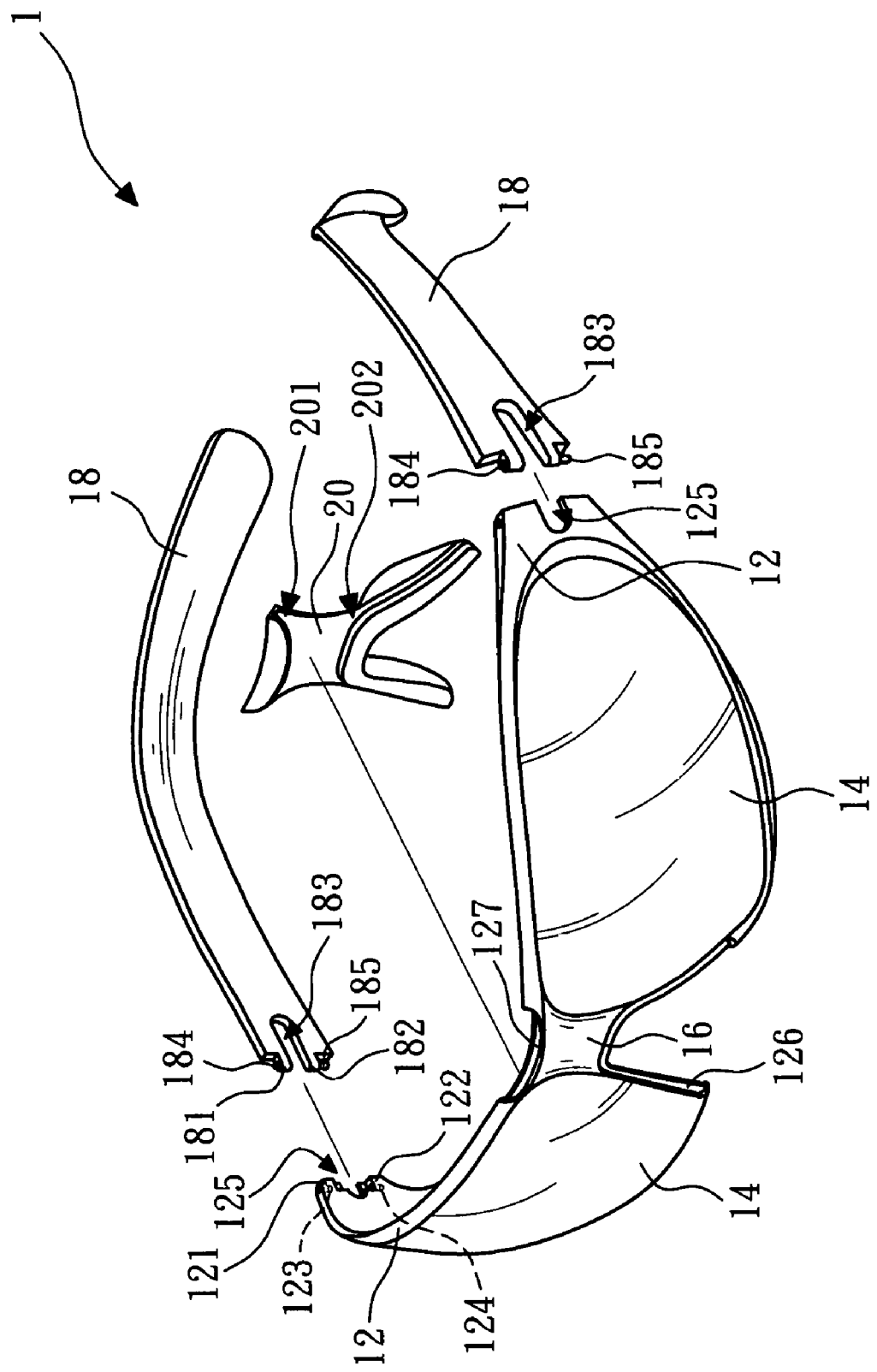
FIG. 1 is a schematic exploded perspective view of a pair of multifunctional glasses according to a first embodiment of the present invention.
Figure 2:
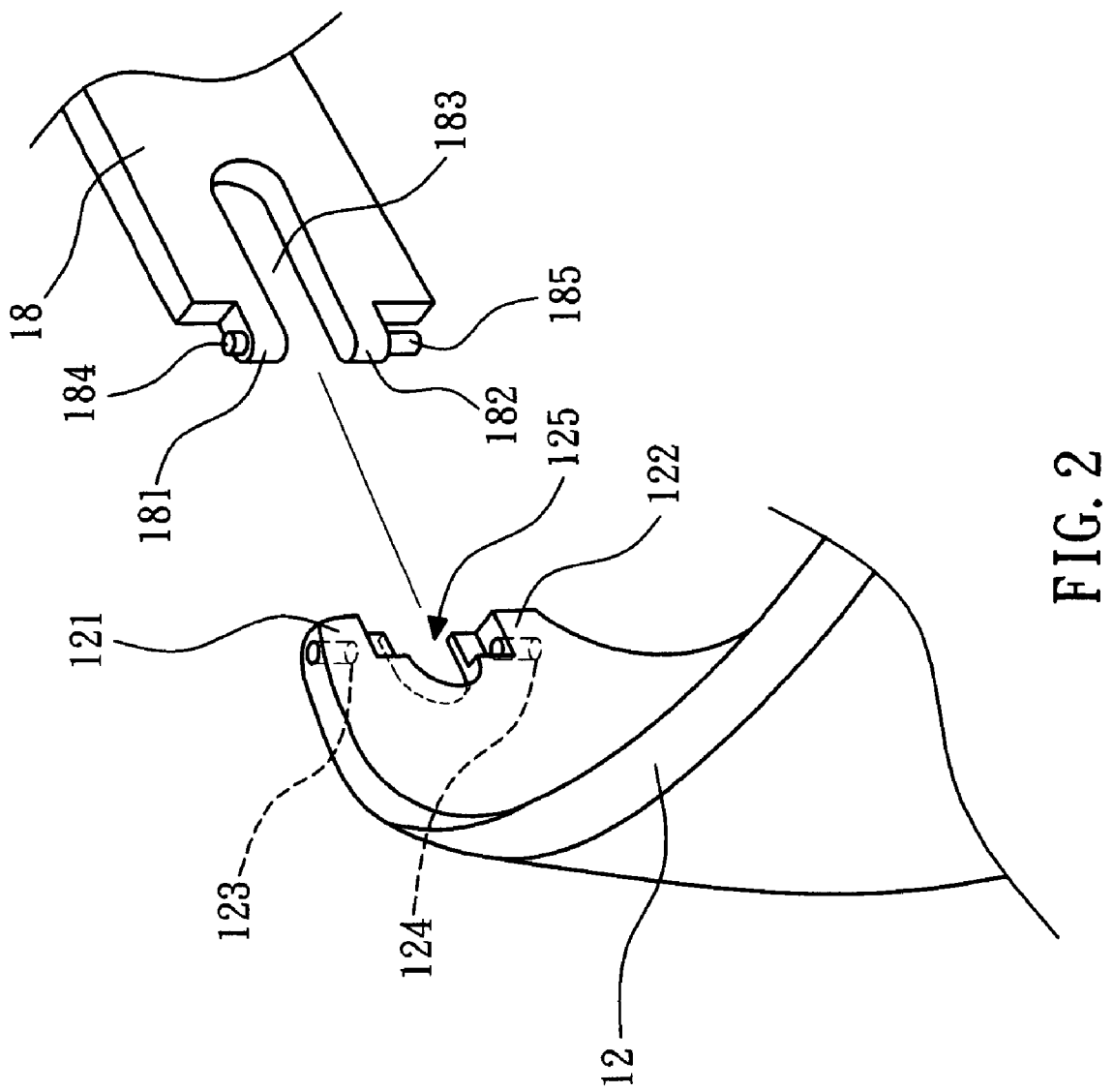
FIG. 2 is a schematic partially enlarged view of FIG. 1.

FIG. 1 is a schematic exploded perspective view of a pair of multifunctional glasses according to a first embodiment of the present invention. FIG. 2 is a schematic partially enlarged view of FIG. 1. The pair of glasses 1 includes a pair of frames 12, a pair of lenses 14, a nose bridge 16, a pair of temples 18, and a nose pad 20.

Each frame 12 has an upper convex rim 121, a lower convex rim 122, a notch 125, a lower engagement edge 126, and an upper engagement edge 127 at the external side. The upper convex rim 121 has an upper aperture 123, while the lower convex rim 122 has a lower aperture 124. The central axis of the upper aperture 123 and the central axis of the lower aperture 124 fall on the same line. Preferably, the upper aperture 123 penetrates the upper convex rim 121, and the lower aperture 124 penetrates the lower convex rim 122. The notch 125 is located between the upper convex rim 121 and the lower convex rim 122. The lower engagement edge 126 is located at a position of the frames 12 below the nose bridge 16. The upper engagement edge 127 is located at a position of the frames 12 above the nose bridge 16.

The lenses 14 are respectively fixed in the frames 12. The nose bridge 16 is located between the frames 12 and connects the frames. In the present invention, the frames 12, the lenses 14, and the nose bridge 16 are integrally formed, and the material thereof is, preferably, plastic.

Each temple 18 has an upper bump 181, a lower bump 182, and an opening 183 at its front end. The upper bump 181 has an upper pin 184 inserted into the upper aperture 123 of the upper convex rim 121. The lower bump 182 has a lower pin 185 inserted into the lower aperture 124 of the lower convex rim 122. The central axis of the upper pin 184 and the central axis of the lower pin 185 fall on the same line. The opening 183 is located between the upper bump 181 and the lower bump 182.

In this embodiment, the length of the upper pin 184 is different from the length of the lower pin 185. Preferably, the length of the lower pin 185 is greater than that of the upper pin 184. Thus, during the assembly, the lower pin 185 is first obliquely inserted into the lower aperture 124 of the lower convex rim 122, and then the front end of the temple 18 is pressed tightly (to narrow the opening 183 between the upper bump 181 and the lower bump 182). Then, the upper pin 184 is inserted into the upper aperture 123 of the upper convex rim 121, and the front end of the temple 18 is released to make the temple 18 engage with the frame 12. This design makes the assembly easy and does not require screws.

The nose pad 20 includes an upper groove 201 and a lower groove 202. The upper groove 201 is engaged with the upper engagement edge 127 of the frames 12, while the lower groove 202 is engaged with the lower engagement edge 126 of the frames 12.

Figure 3:
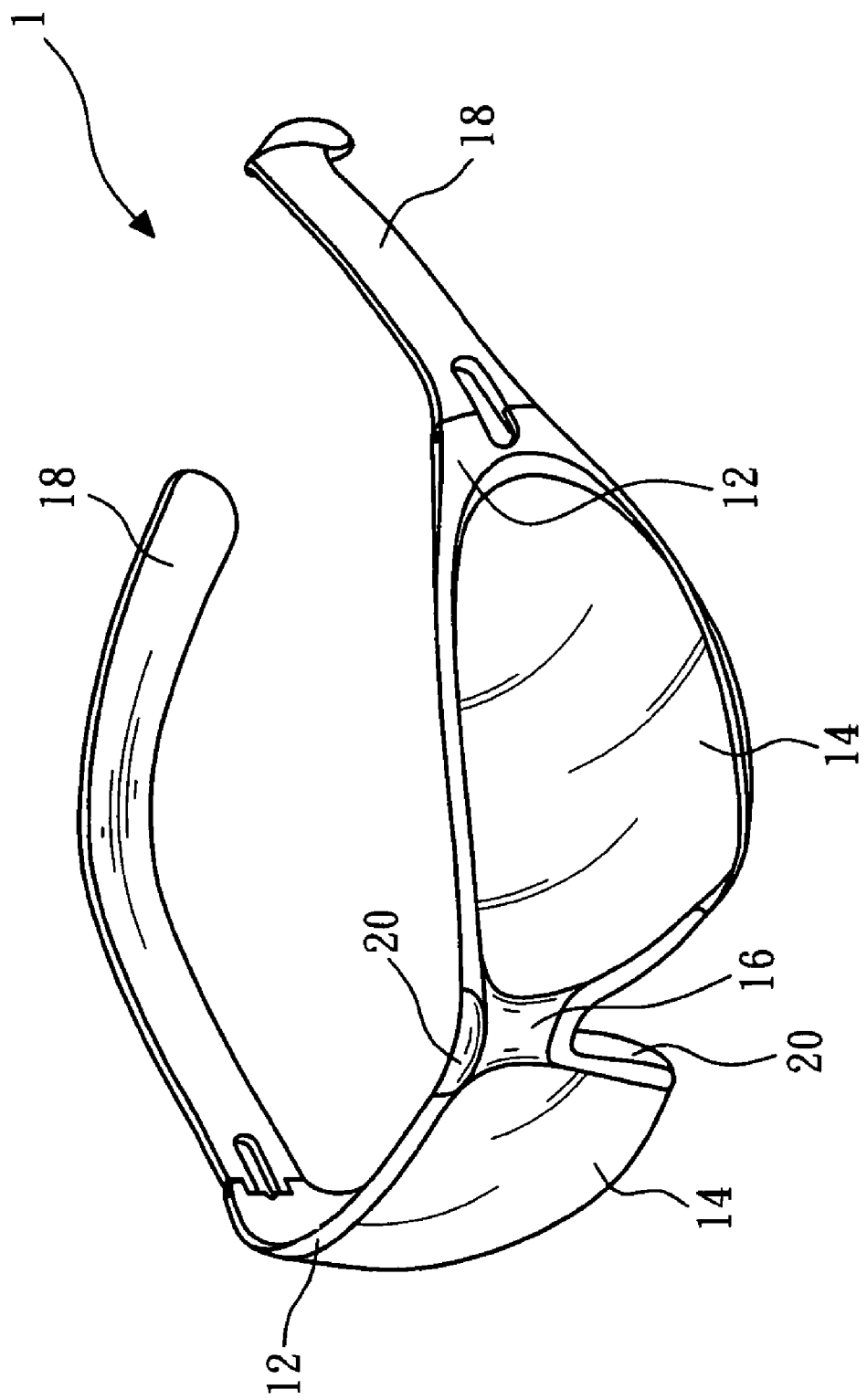
FIG. 3 is a schematic combined perspective view of a pair of multifunctional glasses according to the first embodiment of the present invention.

FIG. 3 is a schematic combined perspective diagram of a pair of multifunctional glasses according to the first embodiment of the present invention. After being assembled in the above manner, the pair of glasses 1 of this embodiment is a pair of industrial safety glasses, which can provide protection from being hurt by scraps, solders, or other splashing chips during operation.

Figure 4:
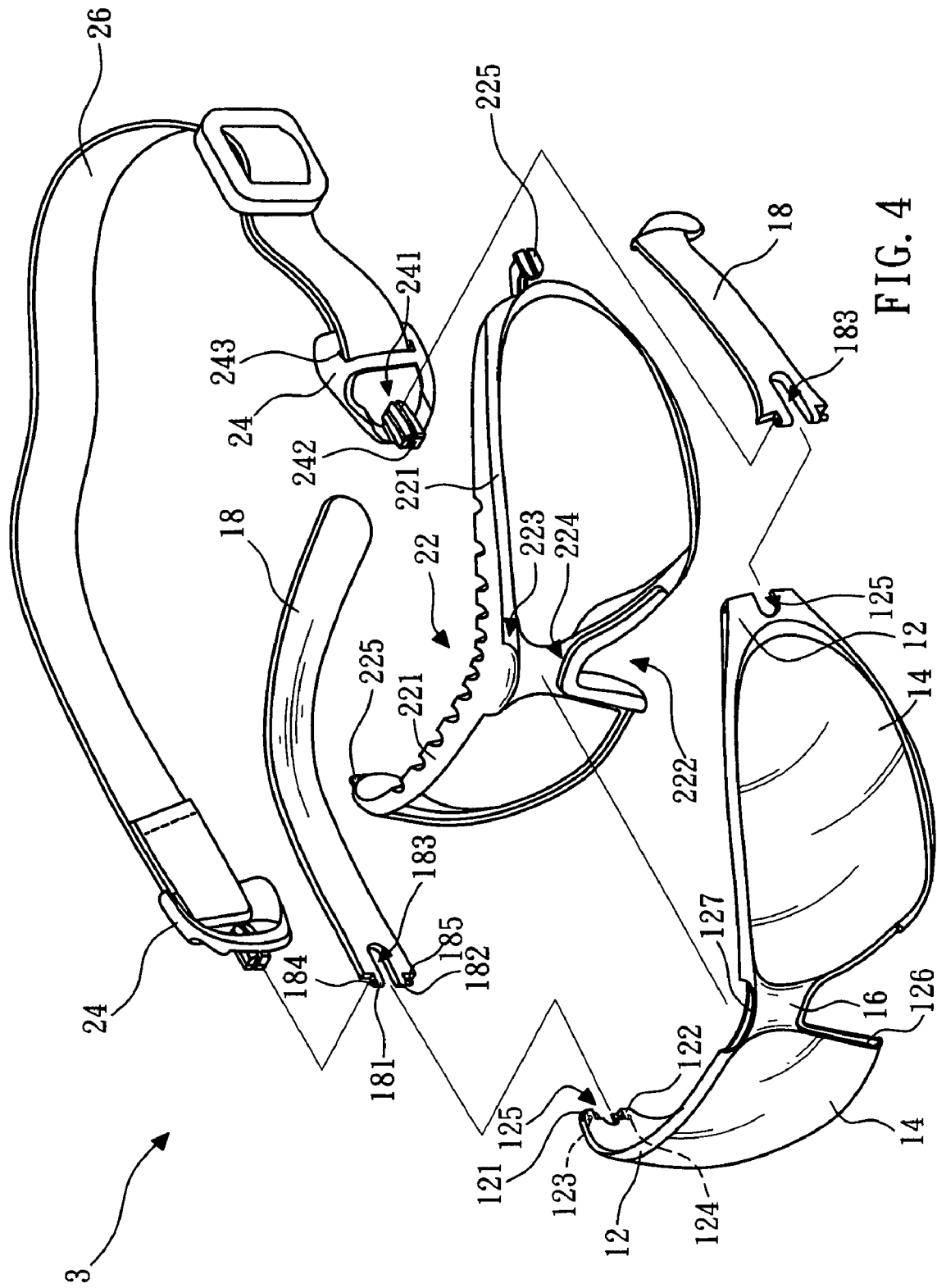
FIG. 4 is a schematic exploded perspective view of a pair of multifunctional glasses according to a second embodiment of the present invention.

FIG. 4 is a schematic exploded perspective view of a pair of multifunctional glasses according to a second embodiment of the present invention. The pair of glasses 3 includes a pair of frames 12, a pair of lenses 14, a nose bridge 16, a pair of temples 18, an inner frame 22, a pair of clasp frames 24, and a glass strap 26.

In this embodiment, the frames 12, the lenses 14, the nose bridge 16, and the temples 18 are identical to those of the first embodiment (referring to FIGS. 1 and 2) respectively.

Each frame 12 has an upper convex rim 121, a lower convex rim 122, a notch 125, a lower engagement edge 126, and an upper engagement edge 127 at the external side. The upper convex rim 121 has an upper aperture 123, while the lower convex rim 122 has a lower aperture 124. The central axis of the upper aperture 123 and the central axis of the lower aperture 124 fall on the same line. Preferably, the upper aperture 123 penetrates the upper convex rim 121, while the lower aperture 124 penetrates the lower convex rim 122. The notch 125 is located between the upper convex rim 121 and the lower convex rim 122. The lower engagement edge 126 is located at a position of the frames 12 below the nose bridge 16. The upper engagement edge 127 is located at a position of the frames 12 above the nose bridge 16.

The lenses 14 are respectively fixed in the frames 12. The nose bridge 16 is located between the frames 12 and connects the frames 12. In the present invention, the frames 12, the lenses 14, and the nose bridge 16 are integrally formed, and the material thereof is, preferably, plastic.

Each temple 18 has an upper bump 181, a lower bump 182, and an opening 183 at its front end. The upper bump 181 has an upper pin 184 inserted into the upper aperture 123 of the upper convex rim 121. The lower bump 182 has a lower pin 185 inserted into the lower aperture 124 of the lower convex rim 122. The central axis of the upper pin 184 and the central axis of the lower pin 185 fall on the same line. The opening 183 is located between the upper bump 181 and the lower bump 182.

In this embodiment, the length of the upper pin 184 is different from that of the lower pin 185. Preferably, the length of the lower pin 185 is greater than that of the upper pin 184. Thus, during the assembly, the lower pin 185 is first obliquely inserted into the lower aperture 124 of the lower convex rim 122, and then the front end of the temple 18 is pressed tightly (to narrow the opening 183 between the upper bump 181 and the lower bump 182). Then, the upper pin 184 is inserted into the upper aperture 123 of the upper convex rim 121, and the front end of the temple 18 is released to make the temple 18 engage with the frame 12. This design makes the assembly easy and does not require screws.

The inner frame 22 includes a pair of ring frame portions 221 and a nose pad portion 222. The ring frame portions 221 and the nose pad portion 222 are integrally formed, and the material thereof is, preferably, plastic. The profile of the ring frame portions 221 corresponds to that of the frames 12, and the ring frame portions 221 are engaged with the frames 12. The nose pad portion 222 is engaged at a position above or below the nose bridge 16. In this embodiment, each ring frame portion 221 has an engagement portion 225 at the external side, to engage with the notch 125 between the upper convex rim 121 and the lower convex rim 122. The nose pad portion 222 includes an upper groove 223 and a lower groove 224, the upper groove 223 is engaged with the upper engagement edge 127 of the frames 12, and the lower groove 224 is engaged with the lower engagement edge 126 of the frames 12.

Preferably, a sponge is adhered to the inner side of the inner frame 22 (not shown), and the profile of the sponge corresponds to that of the inner frame 22.

The clasp frames 24 are engaged with the front end of each temple 18 respectively. In this embodiment, each clasp frame 24 has a main perforation 241, an embedded body 242, and a rear aperture 243. The main perforation 241 is used for the temple 18 to pass through, and the embedded body 242 is engaged with the opening 183 at the front end of the temple 18. The rear aperture 243 is used for the glass strap 26 to pass through. The glass strap 26 is connected to the clasp frames 24, and is preferably an elastic band.

Figure 5:
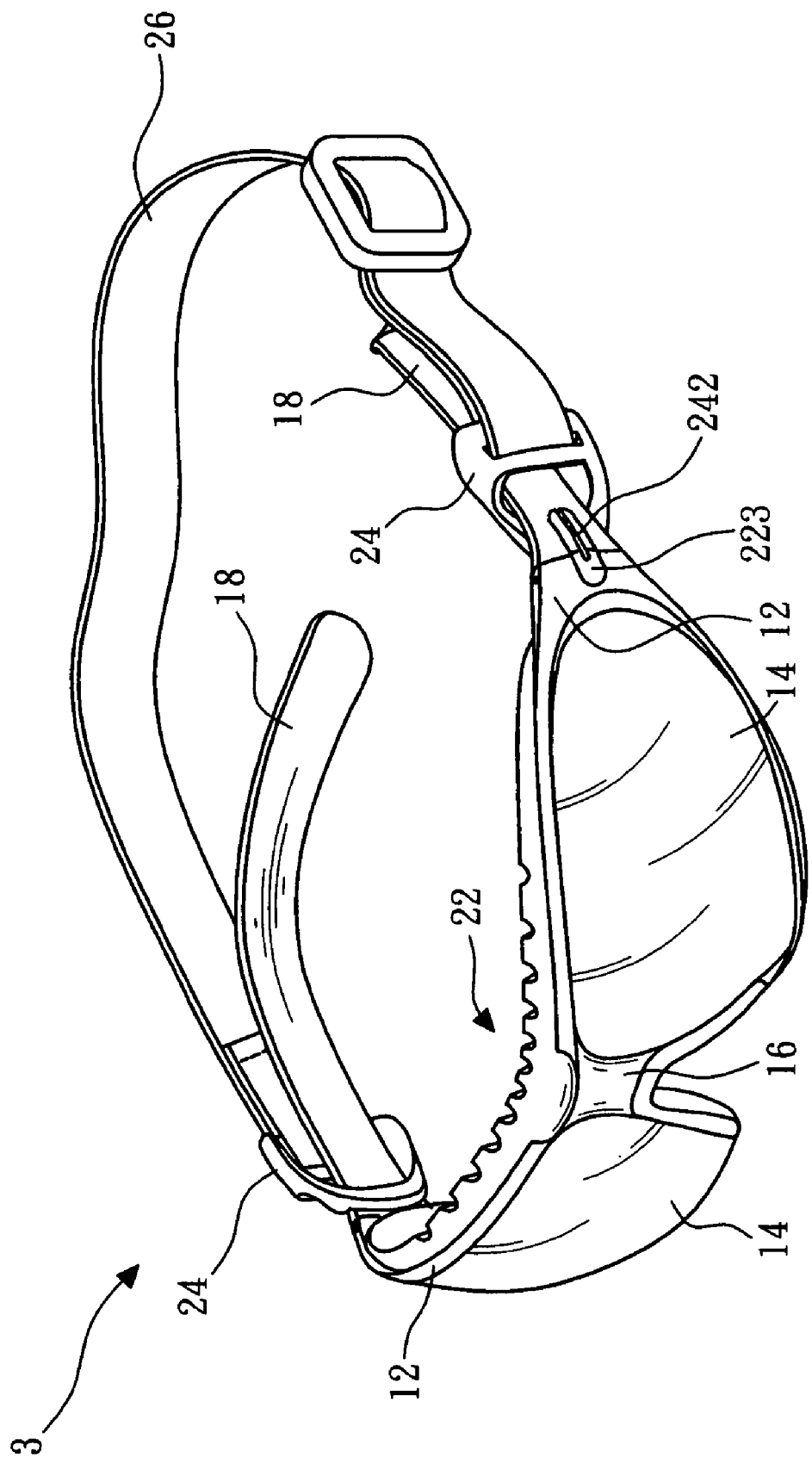
FIG. 5 is a schematic combined perspective view of a pair of multifunctional glasses according to the second embodiment of the present invention.

FIG. 5 is a schematic combined perspective diagram of a pair of multifunctional glasses according to the second embodiment of the present invention. After being assembled in the above manner, the pair of glasses 3 of this embodiment is a pair of motor glasses, which can provide protection from being hurt by sand grains while driving.

The present invention has the following advantages. 1. The frames 12, the lenses 14, and the nose bridge 16 are integrally formed, and the temples 18, the inner frame 22, the nose pad 20, and the clasp frames 24 can be directly formed by injection-molding, so the production efficiency of these components is very high. 2. In the present invention, the temples 18 are engaged with the frames 12 without using screws, which is very convenient to use. 3. In the present invention, if the inner frame 22 and the clasp frames 24 are not assembled, and only the nose pad 20 is assembled with the frames 12, a pair of industrial safety glasses is formed (as shown in FIG. 3), which has an eye-protection structure with optimal strength. On the contrary, in the present invention, if the nose pad 20 is removed, the inner frame 22 and the clasp frames 24 are assembled with the frames 12, and then the glass strap 26 is connected to the clasp frames 24, a pair of motor glasses is formed (as shown in FIG. 5), which will not fall off while driving during high wind. Thus, the glasses of the present invention can function in two different ways.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A pair of glasses, comprising:
    a pair of frames, each having an upper convex rim and a lower convex rim at an external side, wherein the upper convex rim has an upper aperture while the lower convex rim has a lower aperture, and the central axis of the upper aperture and the central axis of the lower aperture fall on the same line;
    a pair of lenses, fixed in the frames;
    a nose bridge, located between the frames and connecting the frames, wherein the frames, the lenses, and the nose bridge are integrally formed; and
    a pair of temples, each having an upper bump and a lower bump at its front end, wherein the upper bump has an upper pin inserted into the upper aperture of the upper convex rim, while the lower bump has a lower pin inserted into the lower aperture of the lower convex rim, and the central axis of the upper pin and the central axis of the lower pin fall on the same line;
    wherein each temple has an opening at its front end;
    wherein the glasses further comprise a pair of clasp frames respectively engaged with the front end of each temple; and
    wherein each clasp frame has a main perforation, an embedded body, and a rear aperture, the main perforation is used for the corresponding temple to pass through, the embedded body is engaged with the opening at the front end of the temple, and the rear aperture is used for a glass strap to pass through.

2. The glasses as claimed in claim 1, wherein the frames have a lower engagement edge at a position below the nose bridge, and an upper engagement edge at a position above the nose bridge.

3. The glasses as claimed in claim 2, further comprising a nose pad having an upper groove and a lower groove, wherein the upper groove is engaged with the upper engagement edge of the frames, and the lower groove is engaged with the lower engagement edge of the frames.

4. The glasses as claimed in claim 1, further comprising an inner frame having a pair of ring frame portions and a nose pad portion, wherein the ring frame portions and the nose pad portion are integrally formed, the profile of the ring frame portions corresponds to that of the frames, the ring frame portions are engaged with the frames, and the nose pad portion is engaged at a position above or below the nose bridge.

5. The glasses as claimed in claim 4, further comprising a sponge attached to the inner frame.

6. The glasses as claimed in claim 1, further comprising a glass strap connected to the clasp frames.

7. The glasses as claimed in claim 1, wherein a length of the upper pin is different from that of the lower pin.

8. A pair of glasses, comprising:
   a pair of frames, each having an upper convex rim and a lower convex rim at an external side, wherein the upper convex rim has an upper aperture while the lower convex rim has a lower aperture, and the central axis of the upper aperture and the central axis of the lower aperture fall on the same line;
   a pair of lenses, fixed in the frames;
   a nose bridge, located between the frames and connecting the frames, wherein the frames, the lenses, and the nose bridge are integrally formed; and
   a pair of temples, each having an upper bump and a lower bump at its front end, wherein the upper bump has an upper pin inserted into the upper aperture of the upper convex rim, while the lower bump has a lower pin inserted into the lower aperture of the lower convex rim, and the central axis of the upper pin and the central axis of the lower pin fall on the same line;
   wherein the frames have a lower engagement edge at a position below the nose bridge, and an upper engagement edge at a position above the nose bridge; and
   wherein the glasses further comprise an inner frame having a pair of ring frame portions and a nose pad portion, wherein the ring frame portions and the nose pad portion are integrally formed, a profile of the ring frame portions corresponds to that of the frames, and each ring frame portion has an engagement portion at the external side, to engage with a notch between the upper convex rim and the lower convex rim, the nose pad portion comprises an upper groove and a lower groove, the upper groove is engaged with the upper engagement edge of the frames, and the lower groove is engaged with the lower engagement edge of the frames.

9. The glasses as claimed in claim 8, further comprising a sponge attached to the inner frame.

10. A pair of glasses, comprising:
    a pair of frames, each having an upper convex rim and a lower convex rim at the external side, wherein the upper convex rim has an upper aperture while the lower convex rim has a lower aperture, and the central axis of the upper aperture and the central axis of the lower aperture fall on the same line;
    a pair of lenses, fixed in the frames;
    a nose bridge, located between the frames and connecting the frames, wherein the frames, the lenses, and the nose bridge are integrally formed, the frames have a lower engagement edge at a position below the nose bridge, and have an upper engagement edge at a position above the nose bridge;
    an inner frame, having a pair of ring frame portions and a nose pad portion, wherein the ring frame portions and the nose pad portion are integrally formed, a profile of the ring frame portions corresponds to that of the frames, the ring frame portions are engaged with the frames, and the nose pad portion is engaged at a position above or below the nose bridge;
    a pair of temples, each having an upper bump and a lower bump at its front end, wherein the upper bump has an upper pin inserted into the upper aperture of the upper convex rim, while the lower bump has a lower pin inserted into the lower aperture of the lower convex rim, and the central axis of the upper pin and the central axis of the lower pin fall on the same line; and
    a pair of clasp frames, each having a main perforation, an embedded body, and a rear aperture, wherein the main perforation is used for the corresponding temple to pass through, the embedded body is engaged with the opening at the front end of the temple, and the rear aperture is used for a glass strap to pass through.

11. The glasses as claimed in claim 10, further comprising a sponge attached to the inner frame.

12. The glasses as claimed in claim 10, wherein each ring frame portion has an engagement portion at the external side to engage with a notch between the upper convex rim and the lower convex rim, the nose pad portion comprises an upper groove and a lower groove, the upper groove is engaged with the upper engagement edge of the frames, and the lower groove is engaged with the lower engagement edge of the frames.

13. The glasses as claimed in claim 10, wherein a length of the upper pin is different from that of the lower pin.

* * * * *